United States Patent
Beverly

(10) Patent No.: US 8,499,169 B2
(45) Date of Patent: Jul. 30, 2013

(54) CLIENT AUTHENTICATION DEVICE AND METHODS THEREOF

(75) Inventor: Harlan T. Beverly, McDade, TX (US)

(73) Assignee: QUALCOMM Incorporated, San Diego, CA (US)

(*) Notice: Subject to any disclaimer, the term of this patent is extended or adjusted under 35 U.S.C. 154(b) by 1303 days.

(21) Appl. No.: 12/174,709

(22) Filed: Jul. 17, 2008

(65) Prior Publication Data
US 2009/0025073 A1 Jan. 22, 2009

Related U.S. Application Data

(60) Provisional application No. 60/950,984, filed on Jul. 20, 2007.

(51) Int. Cl.
*G06F 11/30* (2006.01)
(52) U.S. Cl.
USPC .......................................................... 713/193
(58) Field of Classification Search
USPC .......... 713/194, 162, 164, 168, 193; 726/2–5, 726/34, 35, 27, 29, 6, 7
See application file for complete search history.

(56) References Cited

U.S. PATENT DOCUMENTS

| | | | |
|---|---|---|---|
| 5,353,412 A | 10/1994 | Douglas et al. | |
| 5,355,371 A | 10/1994 | Auerbach et al. | |
| 5,675,736 A | 10/1997 | Brady et al. | |
| 5,771,287 A | 6/1998 | Gilley et al. | |
| 5,890,963 A | 4/1999 | Yen | |
| 6,015,348 A | 1/2000 | Lambright et al. | |
| 6,240,517 B1 | 5/2001 | Nishioka | |
| 6,615,218 B2 | 9/2003 | Mandal et al. | |
| 6,625,661 B1 | 9/2003 | Baldwin, Jr. et al. | |
| 6,745,236 B1 | 6/2004 | Hawkins et al. | |
| 6,763,371 B1 | 7/2004 | Jandel | |
| 6,810,528 B1 | 10/2004 | Chatani | |
| 6,908,389 B1 | 6/2005 | Puskala | |
| 6,918,042 B1 | 7/2005 | Debry | |
| 6,941,353 B1 | 9/2005 | Lane | |
| 6,961,852 B2 | 11/2005 | Craft | |
| 6,988,196 B2 | 1/2006 | Cromer et al. | |
| 7,000,115 B2 | 2/2006 | Lewis et al. | |
| 7,003,548 B1 | 2/2006 | Barck et al. | |

(Continued)

FOREIGN PATENT DOCUMENTS

| | | |
|---|---|---|
| DE | 10218795 | 11/2003 |
| JP | 10314451 | 12/1998 |
| JP | 2001246147 | 9/2001 |

OTHER PUBLICATIONS

PCT International Search Report, Oct. 6, 2008, 4 pages.

*Primary Examiner* — Beemnet Dada
(74) *Attorney, Agent, or Firm* — DeLizio Gilliam, PLLC

(57) ABSTRACT

A method of authenticating a data processing device includes receiving a request to authenticate the data processing device. In response, an authentication key is accessed an authenticated at an authentication module. The authentication key is stored at a storage module that is located within the same integrated circuit package as the authentication module, so that the authentication key can be communicated to the module without exposing the key to unauthorized probing. The integrated circuit package also includes a tamper detection module to determine whether a memory of the data processing device has been accessed. In response to determining the memory has been accessed, the tamper detection module instructs the authentication module to not authenticate the data processing device.

13 Claims, 7 Drawing Sheets

U.S. PATENT DOCUMENTS

| | | | |
|---|---|---|---|
| 7,046,680 B1 | 5/2006 | McDysan et al. | |
| 7,065,756 B2 | 6/2006 | Barsness et al. | |
| 7,139,780 B2 | 11/2006 | Lee et al. | |
| 7,209,449 B2 | 4/2007 | Tang et al. | |
| 7,249,109 B1 | 7/2007 | Silverbrook et al. | |
| 7,274,702 B2 | 9/2007 | Toutant et al. | |
| 2002/0073316 A1* | 6/2002 | Collins et al. | 713/174 |
| 2002/0078223 A1 | 6/2002 | Baldonado et al. | |
| 2002/0136410 A1* | 9/2002 | Hanna | 380/277 |
| 2002/0180583 A1 | 12/2002 | Paatero et al. | |
| 2002/0198932 A1 | 12/2002 | Wagner | |
| 2003/0037237 A1* | 2/2003 | Abgrall et al. | 713/166 |
| 2003/0177187 A1 | 9/2003 | Levine et al. | |
| 2003/0191857 A1 | 10/2003 | Terrell et al. | |
| 2004/0068580 A1 | 4/2004 | Jo et al. | |
| 2004/0230801 A1 | 11/2004 | Sueyoshi et al. | |
| 2004/0246905 A1 | 12/2004 | Dunagan et al. | |
| 2005/0086492 A1 | 4/2005 | Nicodemus et al. | |
| 2005/0107161 A1 | 5/2005 | Fujimoto et al. | |
| 2005/0151777 A1* | 7/2005 | Silverbrook | 347/19 |
| 2005/0188073 A1 | 8/2005 | Nakamichi et al. | |
| 2006/0259579 A1 | 11/2006 | Beverly | |
| 2006/0259632 A1 | 11/2006 | Crawford et al. | |
| 2007/0005986 A1* | 1/2007 | Bernard et al. | 713/185 |
| 2007/0060373 A1 | 3/2007 | Beverly | |
| 2007/0086343 A1 | 4/2007 | Kujawa et al. | |
| 2007/0101408 A1 | 5/2007 | Nakhjiri | |
| 2007/0189517 A1 | 8/2007 | Koseki et al. | |
| 2007/0226498 A1 | 9/2007 | Walmsley et al. | |
| 2007/0297405 A1 | 12/2007 | He | |
| 2007/0298879 A1 | 12/2007 | Kobayashi et al. | |
| 2008/0009337 A1 | 1/2008 | Jackson et al. | |
| 2008/0009352 A1 | 1/2008 | Aoyama et al. | |
| 2008/0010371 A1 | 1/2008 | Yamamoto et al. | |
| 2008/0013551 A1 | 1/2008 | Scholl | |
| 2008/0016236 A1 | 1/2008 | Beverly et al. | |
| 2008/0022389 A1 | 1/2008 | Calcev et al. | |
| 2008/0039208 A1 | 2/2008 | Abrink et al. | |
| 2008/0045285 A1 | 2/2008 | Fujito | |
| 2008/0049621 A1 | 2/2008 | McGuire et al. | |

* cited by examiner

CLIENT AUTHENTICATION DEVICE AND METHODS THEREOF

CROSS REFERENCE TO RELATED APPLICATIONS

This application claims priority to U.S. Provisional Patent Application No. 60/950,984 entitled "METHOD, SYSTEM, AND DEVICE FOR SECURE CLIENT AUTHENTICATION," filed on Jul. 20, 2007, which is assigned to the current assignee hereof and is incorporated herein by reference in its entirety.

FIELD OF THE DISCLOSURE

The present disclosure relates to data processing devices and more particularly relates to authentication of data processing devices.

BACKGROUND

Data processing devices, such as computers, frequently communicate with other data processing devices via a network, such as a bus, local area network, or wide area network. For example, computers are used to communicate with other computers via the Internet in order to conduct a wide variety of activities, such as on-line banking or network games. As these activities have grown, so too has the need for security measures to protect communicated information from undesired scrutiny. For example, it is typically desirable in an online banking transaction to use security measures that prevent unauthorized access to communicated financial information in order to protect a user's bank accounts, ATM connector number, and the like.

One security measure that is sometimes employed is referred to as authentication, whereby a first data processing device does not communicate with a second data processing device until the second device has satisfied an authentication procedure. An example of such an authentication procedure involves the second device proving its authenticity by using an authentication key to which only the second device has access. However, this procedure can fail if the key is obtained by an unauthorized person or device. Accordingly, there is a need for an improved authentication device and methods.

BRIEF DESCRIPTION OF THE DRAWINGS

The present disclosure may be better understood, and its numerous features and advantages made apparent to those skilled in the art by referencing the accompanying drawings.

DETAILED DESCRIPTION

Methods and devices for authenticating a data processing device are disclosed. A method includes receiving a request to authenticate the data processing device. In response, an authentication key is accessed an authenticated at an authentication module. The authentication key is stored at a storage module that is located within the same integrated circuit package as the authentication module, so that the authentication key can be communicated to the module without exposing the key to unauthorized probing. The integrated circuit package also includes a tamper detection module to determine whether a memory of the data processing device has been accessed. In response to determining the memory has been accessed, the tamper detection module instructs the authentication module to not authenticate the data processing device.

Figure 1:
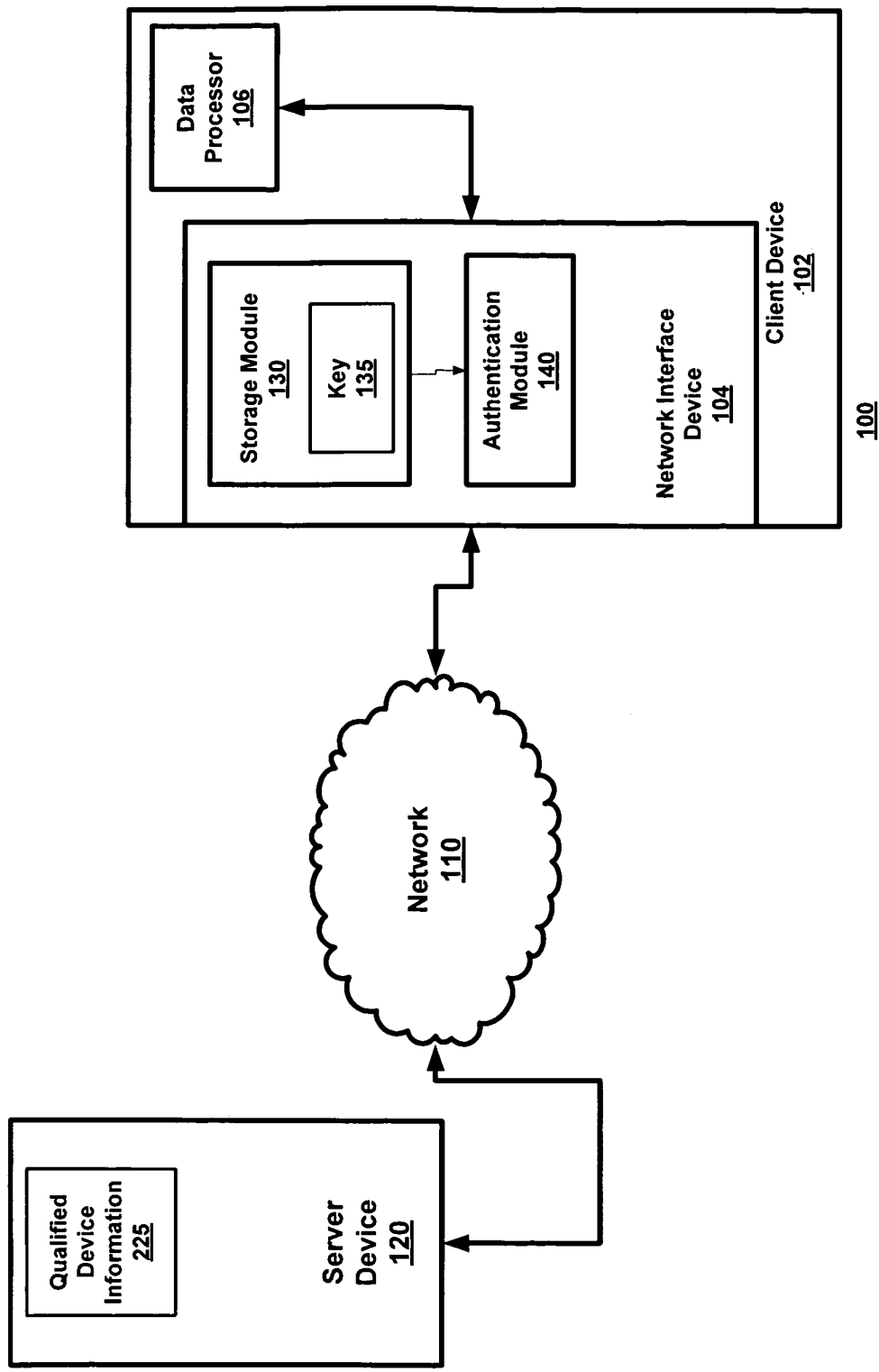
FIG. 1 is a block diagram of a communications system in accordance with one embodiment of the present disclosure.

Referring to FIG. 1, a block diagram of a particular embodiment of a communication system 100 is illustrated. The communication system 100 includes a client device 102, a network 110, and a server device 120. The client device 102 and server device 120 are each connected to the network 110. The network 110 provides a physical communication layer for communications between the server device 120 and the client device 102. For example, the network 110 can be a packet-switched network including one or more routers, servers, and the like, configured to route packets to a destination based on address information associated with each packet. In this configuration, the network 110 can receive packets from each of the server device 120 and the client device 102, and communicate the packets to the other. In a particular embodiment, the network 110 is a wide-area network, such as the Internet. In another embodiment, the network 110 is a local area network. In still another embodiment, the network 110 is a combination of one or more wide area networks and one or more local area networks.

The server device 120 is a device configured to provide and receive information from client devices via the network 110 in order to communicate with users at the client devices. In an embodiment, the server device 120 executes one or more computer programs to provide an interactive experience for each user, and allow the user to manipulate information stored at the server from a remote location. For example, in one embodiment the server device 120 can store banking or financial information for each user, and provide one or more computer programs to allow a user to manipulate the stored banking or financial information (e.g. recording deposits, credit card charges, and the like). In another embodiment, the server device 120 is a game server that executes one or more computer programs to provide an online or networked game. The server device 120 communicates with client devices to allow users to interact with a game world. It will be appreciated that although for purposes of discussion the communication system 100 is illustrated as a client-server architecture, in other embodiments the server device 120 and client device 102 can be peer devices in a peer-to-peer (P2P) network configuration.

The server 120 is configured to communicate information to a client device via a communication session. In particular, the server 120 is configured to receive a request via the network 110 to initiate a communication session with a client device. In response to the request, the server 120 conducts a handshake process with the requesting device to establish a communication protocol between the server 120 and the requesting device in order to allow communication of information. As part of the handshake process, the server device 120 can request that the initiating client device authenticate itself. This ensures that the server device 120 communicates only with qualified devices, reducing the likelihood of unauthorized access to information or programs stored at the server device 120.

In particular, the server device 120 stores a set of qualified device information 125, which includes identification information indicating what client devices are permitted to establish communication sessions with the server device 120. During the handshake process, the server device 120 communicates an authentication request. In response, the server device 120 receives client identification information, referred to herein as a client ID. The client ID can be a code word or value, a digital certificate, or other identification information. The server device 120 compares the client ID to the qualified device information 125 to determine if the client device is authorized for communications with the server device 120. If the server device 120 determines that communications are authorized, it can begin communication of information to the client device. If the server device 120 determines that communications are not authorized, it can terminate the communication session and take other appropriate security measures. For example, the server device 120 can shut down a user account associated with the client device, notify a user associated with the client device of a potential unauthorized attempt to access user information, and the like.

The client device 102 is a computer device, such as a desktop or laptop computer, personal data assistant, cell phone, and the like, that allows a user of the device access to the network 110. In particular, the client device 102 includes a network interface device 104 and a data processor 106. The data processor 106 is configured to execute one or more computer programs that can be manipulated by a user in order to communicate with the server device 120 via the network 110. For example, the data processor 106 can execute a web browser or client game program to allow a user to communicate information with a web content program or server game program at the server device 120. The network interface device 104 is a device, such as a network interface card, that provides a physical and logical layer for communications between the network 110 and the data processor 106. Accordingly, the network interface device 104 can be configured to form information communicated by the data processor 106 into packets or other appropriate format for communication via the network 110. The network interface device 104 can also be configured to receive packets from the network 110 and transform those packets into an appropriate format for the data processor 106.

The network interface device 104 can also be configured to provide authentication information for the client device 102. As illustrated, the network interface device 104 includes a storage module 130 and an authentication module 140. The storage module 130 is a memory module, such as read only memory (ROM), flash memory, and the like, that stores an authentication key 135. The authentication module 140 represents a hardware module, such as digital logic hardware, configured to implement a designated authentication algorithm. In particular, in response to an authentication request received via the network 110, the authentication module 140 executes the authentication algorithm with the authentication key 135 in order to produce client ID information, such as digital code, digital certificate, and the like. The authentication module 140 communicates the client ID to the network 110.

In an embodiment, the storage module 130 and authentication module 140 are incorporated in a common integrated circuit package, such that the storage module 130 is not accessible to modules of the network interface device 104 or the client device 102 other than the authentication module 140. In particular, the connections between the storage module 130 and the authentication module 140 cannot be accessed without physical destruction of the common integrated circuit package. This prevents unauthorized probing of the storage module 130 and unauthorized access to the key 135. This in turn reduces the likelihood that the client ID provided by the authentication module 140 can be simulated by another device, thereby improving security.

It will be appreciated that the authentication module 140 and storage module 130 are illustrated as portions of the network interface device 104. This allows the network interface device 104 to authenticate the client device 102 automatically in response to requests from the server device 120, without intervention from the data processor 106. However, in other embodiments the storage module 130 and authentication module 140 can be incorporated into other portions of the client device 102, including the data processor 106.

Further, it will be appreciated that the illustrated embodiment of FIG. 1 has been described with respect to a client-server communication architecture. However, in other embodiments, a peer-to-peer architecture can be employed. In this architecture, client devices communicate with each other directly. Accordingly, each client device can employ an authentication module and key similar to that illustrated with respect to the client device 102. This allows each client device in the peer-to-peer architecture to provide client ID information to the other clients, thereby establishing secure communication sessions between the client devices.

Figure 2:
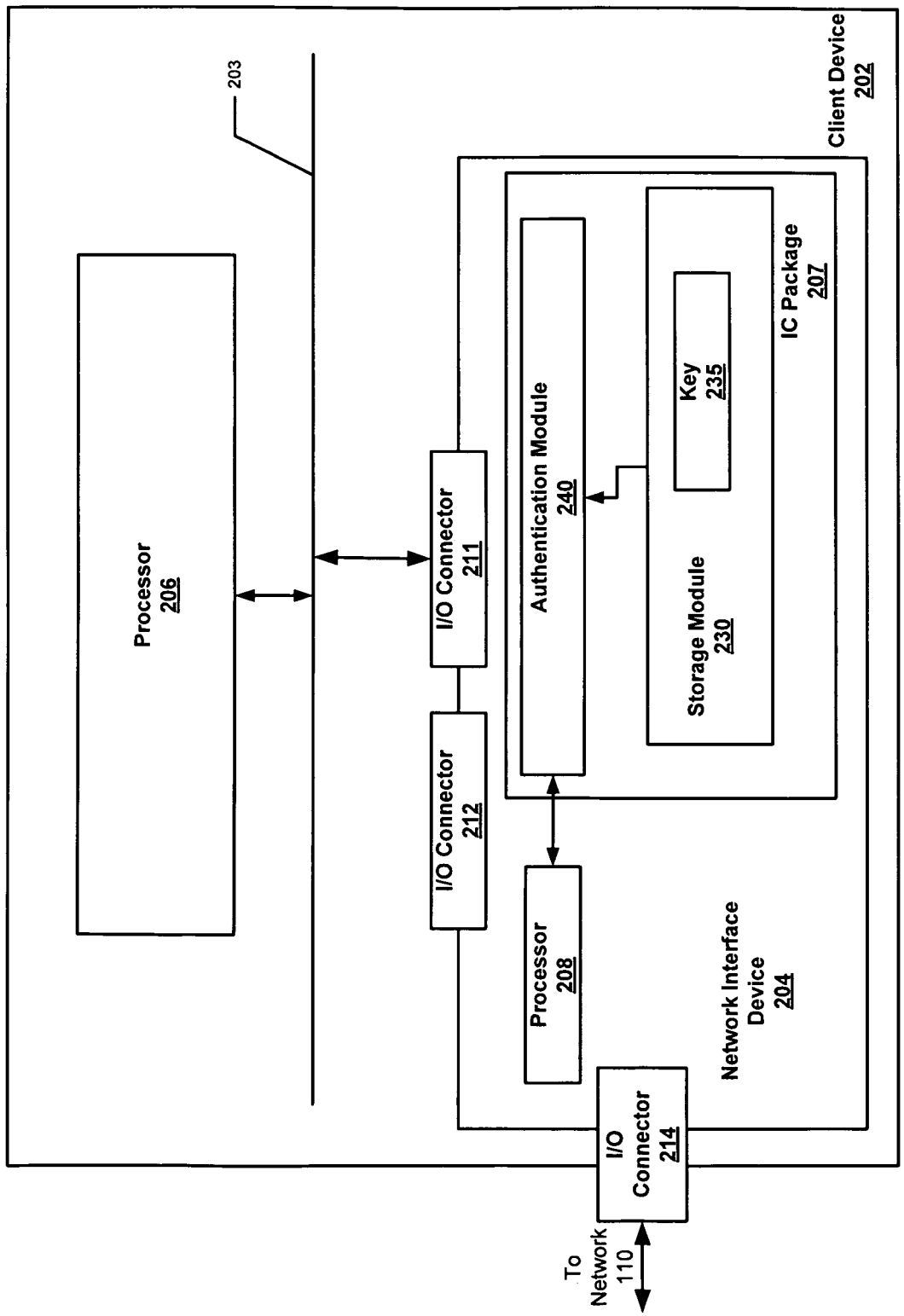
FIG. 2 is a block diagram of a particular embodiment of a client device of FIG. 1.

A particular embodiment of a client device 202, corresponding to the client device 102 of FIG. 1, is illustrated at FIG. 2. The client device 202 includes a processor 206, a bus 203, and a network interface device 204. The processor 206 and the network interface device 204 are each connected to the bus 203. The network interface device 204 includes a second processor 208, a storage module 230, and an authentication module 240. The network interface device 204 also includes a number of input/output (I/O) connectors, including I/O connectors 211, 212, and 214. As used herein, an I/O connector is an external connector of a device that allows the device to provide information, receive information, or both. For example, the I/O connector 214 allows communication of information to the network 110, while the I/O connector 211 allows communication with the bus 203. It will be appreciated that each illustrated I/O connector can represent multiple connectors.

In the illustrated embodiment of FIG. 2, the processor 206 and the network interface device 204 are configured similarly to the corresponding items of FIG. 1. Thus, the network interface device 204 is configured to provide an interface to allow the processor 206 to communicate with the network 110. The second processor 208 is configured to execute one or more computer programs in order to facilitate the communications. In addition, the network interface device 204 is configured to provide client ID information in response to authentication requests received via the network 110. In particular, in response to an authentication request, the second processor 208 requests a client ID from the authentication module 240. In response, the authentication module 240 accesses an authentication key 235 stored at the storage module 230. Based on the authentication key 235, the authentication module 240 generates the client ID, and provides it to the second processor 208. The second processor 208 in turn communicates the client ID to the network 110. In other embodiments, the authentication module 240 is connected directly to the network 110, and provides the client ID directly to the network.

In the illustrated embodiment of FIG. 2, the authentication module 240 and storage module 230 are each incorporated at an integrated circuit (IC) package 207. In a particular embodiment, the IC package 207 is separate from an IC package incorporating the second processor 208. Further, as illustrated in FIG. 2, the storage module 230 is not accessible via any of the I/O connectors of the network interface device 204. In another embodiment, the storage module 230 is also not accessible via any I/O connector (not shown) of the IC package 207. This prevents the storage module 230 from being probed or otherwise accessed in an unauthorized way in order to retrieve the authentication key 235.

Figure 3:
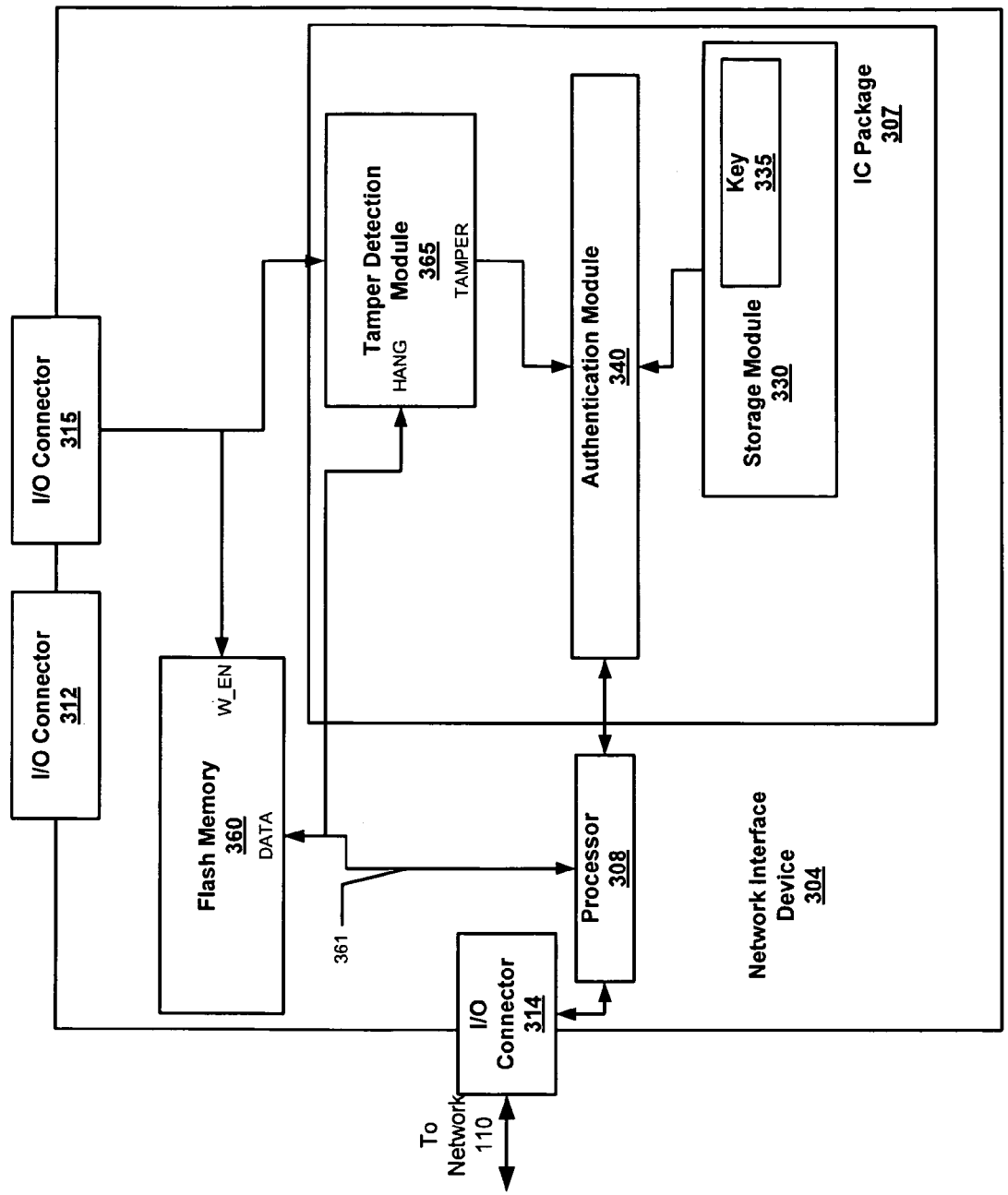
FIG. 3 is a block diagram of a particular embodiment of a network interface device of FIG. 2.

FIG. 3 illustrates an alternative particular embodiment of a network interface device 304, corresponding to the network interface device 104 of FIG. 1. The network interface device 304 includes a processor 308, an authentication module 340, a storage module 330, a flash memory 360, and a tamper detection module 365. The network interface device also includes a number of I/O connectors, including I/O connectors 312, 314, and 315. The processor 308 is connected to a bus 361, and is further connected to the authentication module 340. The flash memory 360 includes an output labeled "DATA" connected to the bus 361 and an input labeled W_EN connected to the I/O connector 315. The tamper detection module includes an input connected to the W_EN input of the flash memory 360, an output labeled "HANG" connected to the bus 361, and an output labeled "TAMPER." The authentication module 340 includes an input connected to the TAMPER output of the tamper detection module 365.

The processor 308, the authentication module 340, and the storage module 330 are each configured similarly to the corresponding items of FIG. 2. In particular, the storage module 330 stores an authentication key 335. In response to requests from the processor 308, the authentication module 340 can provide a client ID based on the authentication key 335 and based on the authentication algorithm implemented by the hardware of the authentication module 340. As illustrated, the authentication module 340, the tamper detection module 365, and the storage module 330 are each incorporated in an integrated circuit package 307, so that the storage module 330 is not externally accessible. In an embodiment, the integrated circuit package 307 is a ball grid array (BGA) package.

The flash memory 360 is non-volatile memory configured to store configuration or other information for the processor 308. For example, the flash memory 360 can store boot code, device identification information, security information, and the like. It will be appreciated that, in other embodiments, the flash memory 360 can be another type of non-volatile memory, such as a ROM. The flash memory is further configured to provide the stored information to the processor 308 via the bus 361.

The flash memory 360 is configured to be writable in response to assertion of a signal at the W_EN input. Further, if the signal at the W_EN input is negated, then information cannot be written to or stored at the flash memory 360. It will be appreciated that the terms "asserted" and "negated" refer to complementary states, and do not refer to particular logic states. Thus, an asserted signal can be a logic value "1" or "0", depending on the particular implementation of the flash memory 360. Similarly, a negated signal can be a logic value "1" or "0", so long as it is the opposite or different from the asserted signal. In addition, in an embodiment, the flash memory is separated into portions, and only a portion of the flash memory 360 is writable based on the signal at the W_EN input, while other portions writeability does not depend on the same signal.

The tamper detection module 365 is configured to detect the state of the signal at the W_EN input of the flash memory 360 and, based on the state of this signal assert a value at the HANG output in order to fix a value on the bus 361. In particular, if the tamper detection module 365 determines that the signal at the W_EN input is asserted, it asserts a value at the HANG output to fix a value on the bus 361 to a predetermined value, thereby rendering the bus 361 unsuitable for data transfer. In addition, in response to determining the signal at the W_EN input is asserted, the tamper detection module is configured to assert a signal at the TAMPER output.

The authentication module 340 is configured, when the signal at the TAMPER output is negated, to provide a client ID based on the key 335 in response to requests from the processor 308. In response to assertion of the signal at the TAMPER output of the tamper detection module 365, the authentication module 340 is configured to provide a fixed value to the processor 308 in response to an authentication request. The fixed value does not correspond to the client ID, thus indicating that the client device 102 is not authenticated.

In operation, configuration or other information can be stored at the flash memory 360. For purposes of discussion, it is assumed the stored information is boot information for the processor 308. The boot information during a manufacturing or other stage of development of the network interface device 304, prior to providing the device to a user.

The information is stored by asserting a signal at the I/O connector 315, thereby asserting the signal at the W_EN input. This places the flash memory 360 in a writable state, and the boot information is provided via a data input (not shown). When the information is stored, the tamper detection module 365 is not connected to, or is otherwise isolated from, the W_EN input so that it does not perform tamper detection during the initial storage process.

After the boot information is stored, the signal at the W_EN input is negated. In an embodiment, the signal is negated by connecting the W_EN input to a reference voltage, such a ground or power supply reference. In addition, after the boot information is stored, the tamper detection module is connected to the W_EN input as illustrated in FIG. 3. The network interface device 304 is then provided to a user for installation at the client device 102. During normal operation, the processor 308 accesses the boot code via the bus 361 to boot and configure the network interface device 304. Thus, during normal operation of the network interface device 304 at the client device 102, the signal at the W_EN input is negated, so that the flash memory 360 is not writeable. This prevents unauthorized tampering with the boot code, thereby reducing the likelihood that the processor 308 can be hacked or otherwise improperly controlled.

The tamper detection module 365 protects the network interface device 304 from unauthorized access. In particular, an unauthorized person (referred to for purposes of discussion as a "hacker") can attempt to write information to the flash memory 360. To do so, the hacker can place a probe or other device on the I/O connector 315 in order to assert a signal at the W_EN input and thereby render the flash memory 360 writeable. However, the tamper detection module 365 detects the assertion of the signal and, in response, provides a value (such as an FFFF hexadecimal value) at the HANG output. This value is thereby provided on the bus 361, such that information cannot be communicated from the flash memory 360 to the processor 308. In an embodiment, the tamper detection module 365 fixes the value at the HANG output for future operation of the network interface device 304. In other words, even after a reset of the network interface device 304, the value at the HANG output remains fixed, so that the bus 361 cannot transfer information between the flash memory 360 and the processor 308, thereby preventing the processor 308 from booting or otherwise configuring the network interface device 304. Accordingly, in response to an unauthorized attempt to write to the flash memory 360, the tamper detection module 365 renders the bus 361 unusable.

In addition, in response to detecting assertion of the signal at the W_EN input, the tamper detection module 365 asserts a signal at the TAMPER output. In response, the authentication module 340 provides a fixed value to the processor 308 in response to any authentication requests. The fixed value does not correspond to a client ID value based on the authentication key 335. Thus, in response to assertion of the signal at the W_EN input (indicating an unauthorized attempt to hack the network interface device 304), the authentication module 340 provides information indicating the client device 102 is not authentic. This prevents the server device 120 (FIG. 1) from conducting a communication session with the client device 102. Thus, the tamper detection module 365 ensures that a tampered device cannot communicate with the server device 120, reducing the likelihood that information at the server device 120 will be subject to unauthorized access.

In another embodiment, the tamper detection module 365 is configured to determine whether the flash memory 360 has been tampered based on data communicated via the bus 361. In particular, the tamper detection module 365 can monitor data, such as configuration data, communicated via the bus 361 and compare the data to expected data. If the monitored data does not match the expected data, the tamper detection module 365 can fix the bus 361 at a fixed value, as described above. Further, the tamper detection module 365 can indicate to the authentication module 340, via the TAMPER output, that the client device 102 should not be authenticated, as described above. In an embodiment, the tamper detection module 361 compares the monitored data to expected data by determining a hash value based on the monitored data and comparing the hash value to an expected value.

Figure 4:
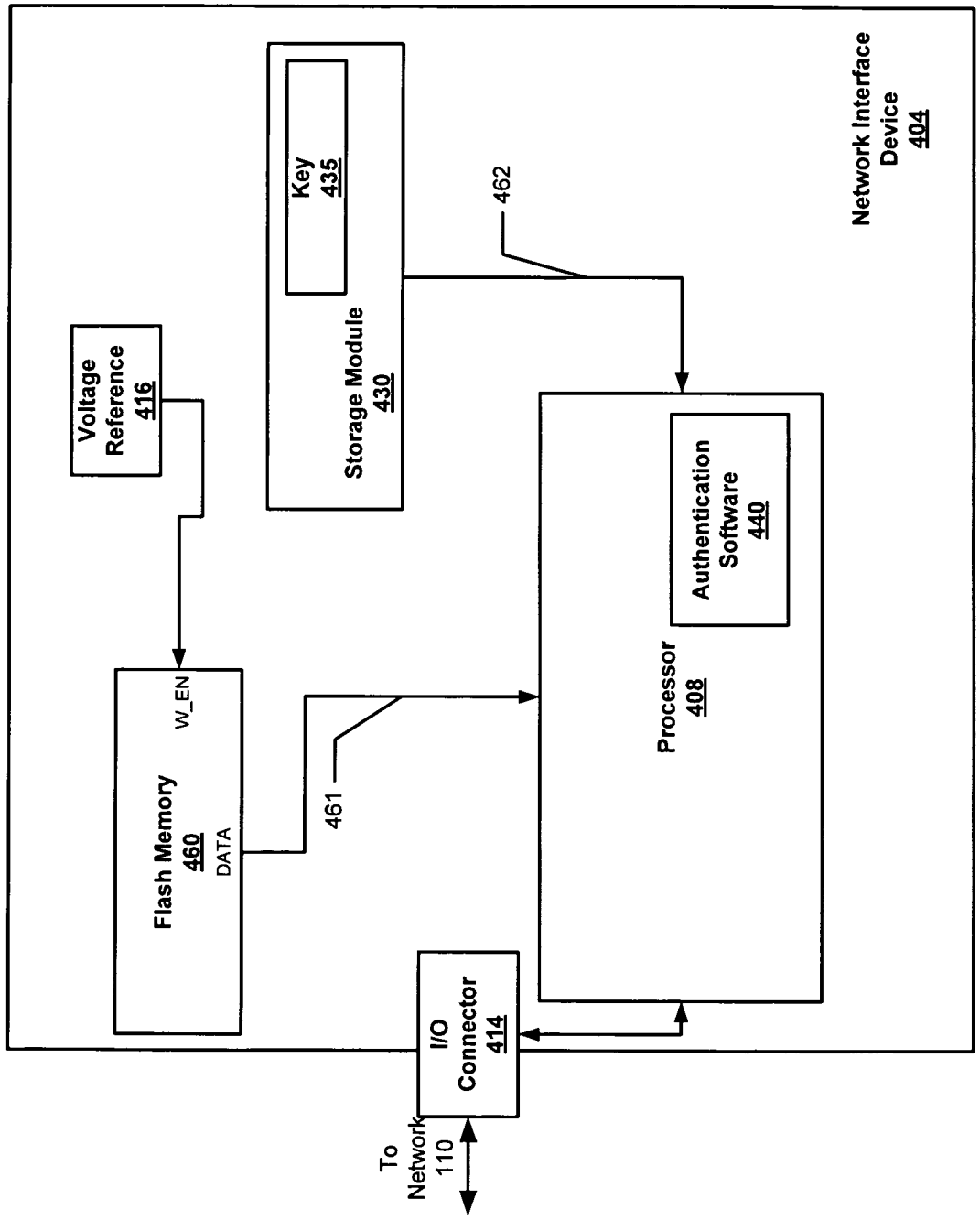
FIG. 4 is a block diagram of a network interface device in accordance with one embodiment of the present disclosure.

Referring to FIG. 4, a block diagram of an a particular embodiment of a network interface device 404 having an I/O connector 414, a processor 408, a storage module 430, a flash memory 460, and a voltage reference 416. The processor 408 is connected to a bus 361, and is further connected to an interconnect 462. The flash memory 460 includes an output labeled "DATA" connected to the bus 361 and an input labeled W_EN. The voltage reference includes an output connected to the W_EN input of the flash memory 460.

The flash memory 460 is configured to be writable in response to assertion of a signal at the W_EN input. Further, if the signal at the W_EN input is negated, then information cannot be written to or stored at the flash memory 460. In addition, in an embodiment, the flash memory is separated into portions, and only a portion of the flash memory 460 is writable based on the signal at the W_EN input, while other portions writeability does not depend on the same signal.

In operation, configuration or other information can be stored at the flash memory 460. For purposes of discussion, it is assumed the stored information is boot information for the processor 408. The boot information during a manufacturing or other stage of development of the network interface device 404, prior to providing the device to a user. The information is stored by asserting a signal at the I/O connector 415, thereby asserting the signal at the W_EN input. This places the flash memory 460 in a writable state, and the boot information is provided via a data input (not shown). When the information is stored, the voltage reference is not connected to, or is otherwise isolated from, the W_EN input.

After the boot information is stored, the voltage reference 416 is connected to the W_EN input, and provides a voltage level so that a signal at the W_EN input is negated. Thus, during normal operation of the network interface device 404 at the client device 102, the signal at the W_EN input is negated, so that the flash memory 460 is not writeable. This reduces the likelihood of unauthorized tampering with the boot code, thereby reducing the likelihood that the processor 408 can be hacked or otherwise improperly controlled.

In addition, during operation the processor 408 executes authentication software 440. The authentication software 440 is configured to perform an authentication procedure, such as an RSA procedure, based on a key 435 stored at the storage module 430. In particular, in response to an authentication request received via the network 110, the processor 408 executes the authentication software 440. In response, the authentication software 440 retrieves the key 435 from the storage module 440 via the interconnect 462 and determines a client ID for the network interface device based on the key 435 using the authentication procedure.

The interconnect 462 is a connection that configured to be protected from external probing or access. For example, the interconnect 462 can be a hidden via or buried trace whereby the interconnect 462 is embedded into an internal layer of a printed circuit board so that it cannot by physically contacted with an external probe. In another embodiment, the interconnect 462 is a potted connection. By configuring the interconnect 462 to be protected from external probing, the key 435 can be provided to the processor 408 without being exposed to access via an external probe. This reduces the likelihood that the key 435 can be hacked, improving the security of the network interface device 404.

Figure 5:
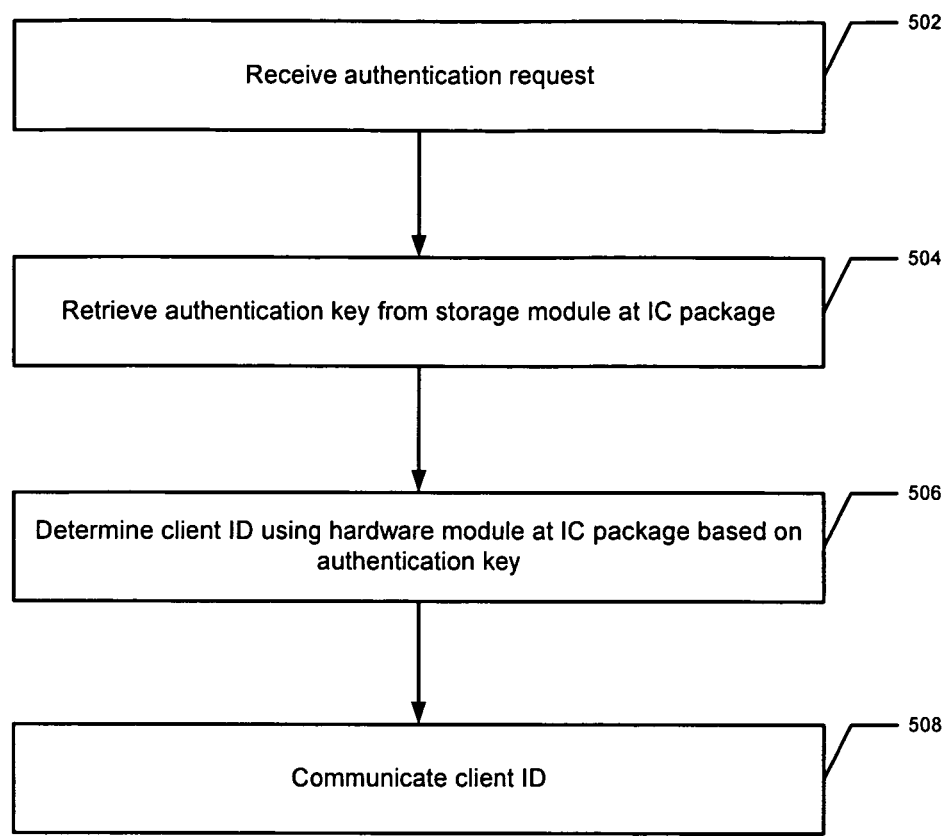
FIG. 5 is a flow diagram of a method of authenticating a client device in accordance with one embodiment of the present disclosure.

Referring to FIG. 5, a flow diagram of a particular embodiment of a method of authenticating a device is illustrated. At block 502, an authentication request for a device is received at the device. In an embodiment, the authentication request is received from another device via a network in order to establish a communication session between the devices. At block 504, the receiving device retrieves an authentication key stored a storage module. The storage module is incorporated in an IC package. At block 506, an authentication module at the same IC package as the storage module determines a client ID based on the retrieved authentication key. In an embodiment the authentication module is a hardware module configured to implement a designated authentication algorithm. At block 508, the device communicates the client ID to the device that sent the authentication request.

Figure 6:
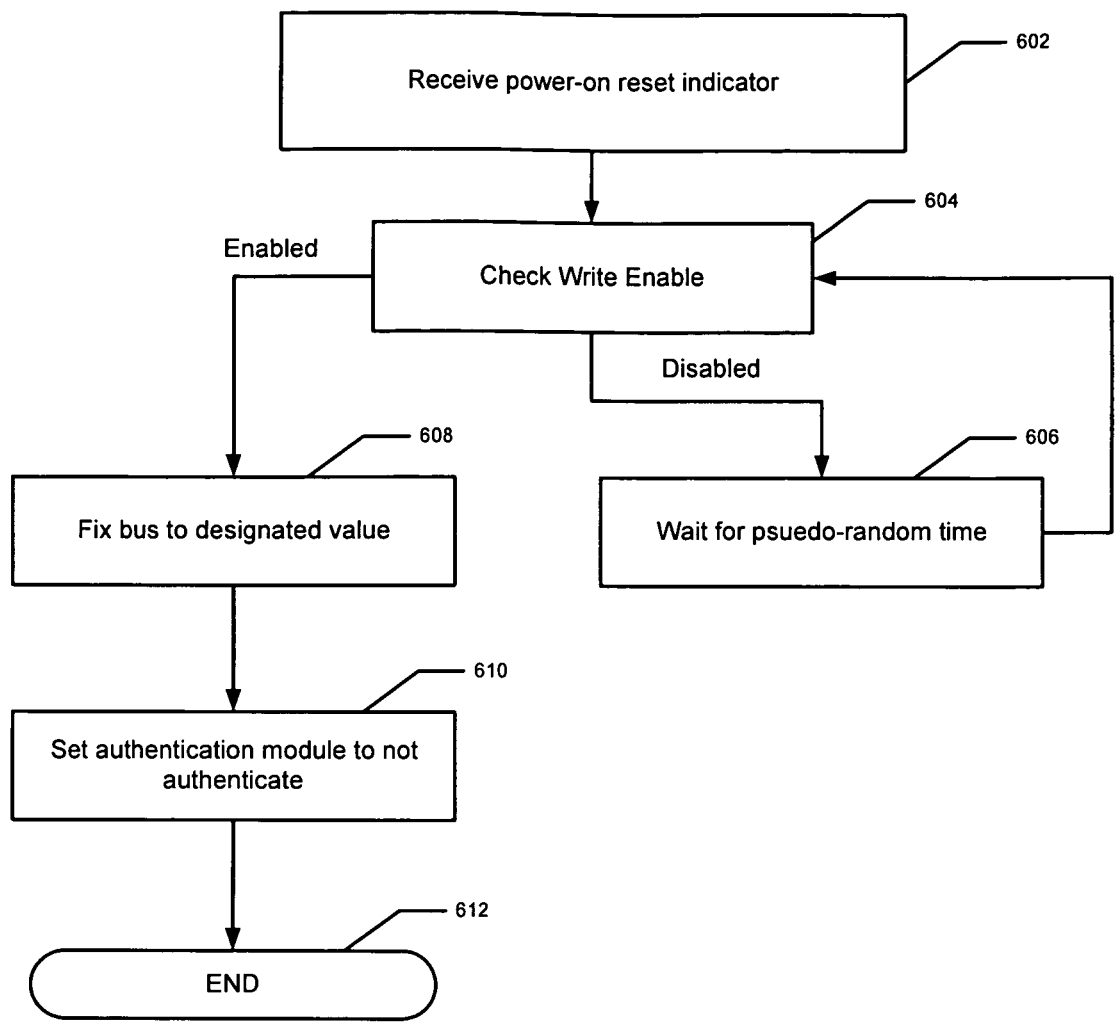
FIG. 6 is a flow diagram of a method of authenticating a client device in accordance with another embodiment of the present disclosure.

Referring to FIG. 6, a flow diagram of a particular embodiment of a method of protecting a device from tampering is illustrated. At block 602, a power-on reset indicator is received at the device. In response, at block 604 the device determines whether a write enable input for a memory at the device is enabled. As used herein, the write enable input is enabled when it is in a state that allows the memory, or portion of the memory, to be written. The write enable input is disabled when it is in a state that does not allow the memory to be written. If it is determined that the write enable input is not enabled (so that the memory cannot be written to), the method flow moves to block 606 and the device waits for a pseudo-random amount of time. Upon expiration of this pseudo-random time, the method flow returns to block 604 and the device again determines whether the write enable input is enabled.

If, at block 604, if it is determined that the write enable input is disabled, the method flow proceeds to block 608 and the device fixes a bus on which the memory can provide stored data to a fixed value. By placing the fixed value on the bus, the device prevents data from being communicated by the memory on the bus, thus impairing operation of the device. In an embodiment, the fixed value is maintained on the bus after subsequent power-on reset events at the device, thereby impairing the operation of the device permanently or for an extended period of time. In addition, at block 610, an authentication module at the device is set to a state whereby the module does not properly authenticate the device in response to authentication requests from other devices. Thus, if the write enable input of the memory indicates the memory has been tampered with, the device will not be authenticated to other devices, and thereby be prevented from communicating with those other devices. At block 612, the method flow ends.

Figure 7:
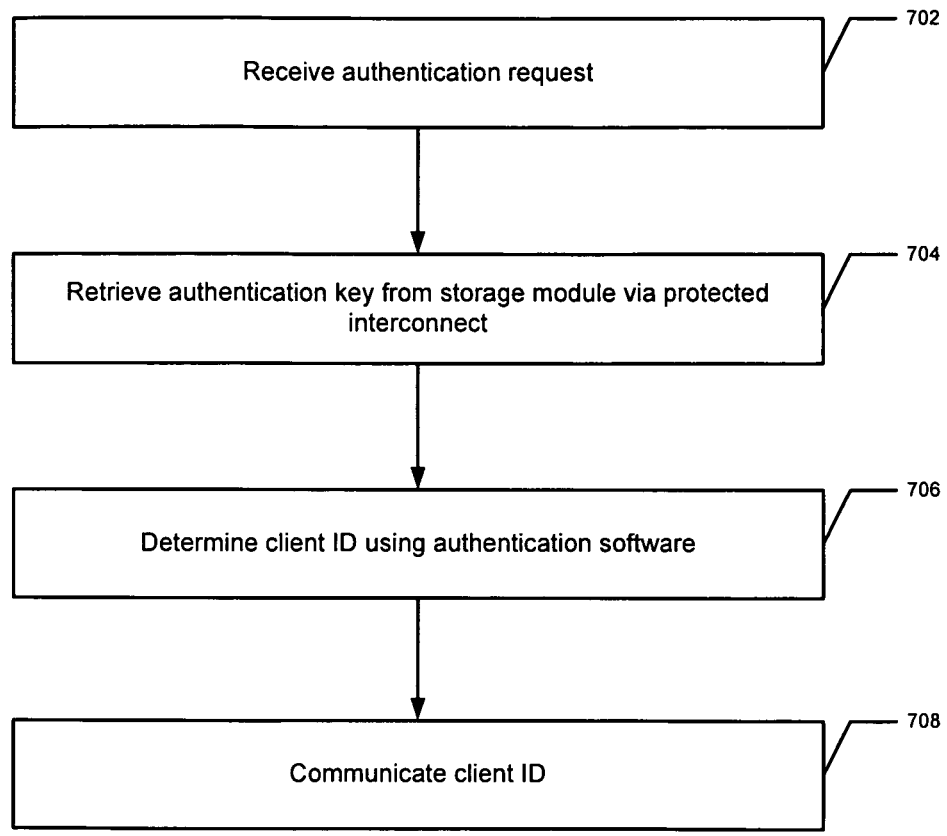
FIG. 7 is a flow diagram of a method of authenticating a client device in accordance with another embodiment of the present disclosure The use of the same reference symbols in different drawings indicates similar or identical items.

Referring to FIG. 7, a flow diagram of a particular embodiment of a method of authenticating a device is illustrated. At block 702, an authentication request for a device is received at the device. In an embodiment, the authentication request is received from another device via a network in order to establish a communication session between the devices. At block 704, the receiving device retrieves an authentication key stored a storage module via a protected interconnect. As used herein, the term "protected interconnect" refers to a connection that is protected from external probing. Examples of protected interconnects include buried or hidden traces, potted connections, and the like. At block 706, an authentication software at a processor determines a client ID based on the retrieved authentication key. At block 708, the device communicates the client ID to the device that sent the authentication request.

The above disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method, comprising:
  receiving a request to authenticate a client device via a network;
  in response to receiving the request:
    retrieving an authentication key from a storage module at the client device, the storage module located at a first integrated circuit package;
    determining at a tamper detection module whether a memory of the client device has been accessed;
    in response to determining the memory of the client device has not been accessed,
      using the authentication key at an authentication module to determine an authentication result for the client device, the authentication module located at the first integrated circuit package;
    communicating the authentication result via the network; and
    in response to determining a portion of the memory of the client device has been accessed, fixing a data bus of the memory at a predetermined voltage.

2. The method of claim 1, wherein receiving the request to authenticate the client device comprises receiving the request at a processor of the client device, the processor located at a second integrated circuit package different from the first.

3. The method of claim 1, wherein the first integrated circuit package includes a plurality of external connectors, and wherein the storage module is inaccessible via the plurality of external connectors after storage of the authentication key.

4. The method of claim 1, further comprising:
  wherein authenticating the authentication key comprises setting the authentication result to indicate a denial of authentication in response to determining the memory has been accessed.

5. A method, comprising:
  receiving a request to authenticate a client device via a network;
  in response to receiving the request:
    retrieving an authentication key from a storage module at the client device via an interconnect that is protected from external probing;
    using the authentication key to determine an authentication result; and
    communicating the authentication result via the network;
  receiving configuration information from a memory;
  configuring a processor of the client device based on the configuration information;
  fixing a write-enable input of the memory at a defined value so that data cannot be stored at the memory; and
  monitoring a voltage of the write-enable input of the memory to detect tampering of the memory.

6. The method of claim 5, wherein receiving the authentication key to authenticate the client device comprises receiving the request at the processor of the client device, the processor coupled to the storage module via the interconnect.

7. A device, comprising:
  a network interface module configured to receive an authentication request from a network;
  a processor;
  a memory coupled to the processor via a bus, the memory comprising a write enable input configured to place the memory in a writeable state based on a signal at the write enable input; and
  a first integrated circuit package, comprising:
    a storage module configured to store an authentication key;
    an authentication module configured to access the authentication key and to determine an authentication result based on the authentication key in response to the authentication request; and
    a tamper detection module coupled to the authentication module, the tamper detection module configured to:
      detect tampering of the memory,
      provide control information to the authentication module indicating whether the memory has been tampered, and
      fixing the bus at a predetermined voltage in response to determining the memory has been tampered.

8. The device of claim 7, wherein the processor comprises a second integrated circuit package different from the first.

9. The device of claim 7, wherein the first integrated circuit package includes a plurality of external connectors, and wherein the storage module is inaccessible via the plurality of external connectors.

10. The device of claim 7, wherein the authentication module is configured to set the authentication result to indicate a denial of authentication in response to determining the control information indicates the memory has been tampered.

11. The device of claim 7, wherein the tamper detection module is configured to detect tampering of the memory by monitoring a voltage of the write enable input of the memory.

12. The device of claim 7, wherein the tamper detection module is configured to detect tampering of the memory by comparing data communicated via the bus with expected values.

13. The device of claim 12, wherein the tamper detection module is configured to compare data communicated via the bus by comparing a hash value based on the data to an expected hash value.

* * * * *